US007860618B2

(12) United States Patent
Brandstetter et al.

(10) Patent No.: US 7,860,618 B2
(45) Date of Patent: Dec. 28, 2010

(54) SYSTEM, METHOD AND PROGRAM PRODUCT FOR PREDICTING FLEET RELIABILITY AND MAINTAINING A FLEET OF VEHICLES

(75) Inventors: Jason C. Brandstetter, St. Louis, MO (US); Patrick J. Langlet, O'Fallon, MO (US); Roberto E. Altschul, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1041 days.

(21) Appl. No.: 11/614,918

(22) Filed: Dec. 21, 2006

(65) Prior Publication Data

US 2008/0154458 A1 Jun. 26, 2008

(51) Int. Cl.
*G06F 19/00* (2006.01)

(52) U.S. Cl. .............................. 701/29; 701/30; 701/36

(58) Field of Classification Search ..................... 701/1, 701/29–36, 43–45, 49; 705/7, 8, 35, 36
See application file for complete search history.

(56) References Cited

U.S. PATENT DOCUMENTS 4,414,629 A 11/1983 Waite
6,832,205 B1 12/2004 Aragones et al.
7,654,456 B2 * 2/2010 Roewer ...................... 235/385

* cited by examiner

*Primary Examiner*—Richard M. Camby
(74) *Attorney, Agent, or Firm*—Law Office of Charles W. Peterson, Jr.

(57) ABSTRACT

A system, method and program product for maintaining fleet performance for a fleet of platforms, especially for a fleet of aircraft. Part removal data is contained in a maintenance database. A query is constructed for extracting part removal data from the maintenance database. Weibull analysis is applied to extracted part removal data. Exposed aircraft with parts being likely to fail within a given time period are identified from the Weibull analysis results. Overall part failure numbers are generated for each failing part. Inventory is checked to determine if sufficient spares are available to repair all expected failures. Any shortfalls may be covered. A risk report is generated for the fleet and for inventory. Each risk report highlights likely problems that may require immediate attention.

21 Claims, 6 Drawing Sheets

150

| PROBABILITY OF FAILURE | BUNO | HIGH RISK PART | WUC | PART NUMBER | PROBABILITY OF FAILURE |
|---|---|---|---|---|---|
| 148 1 | 165897<br>165897<br>165897<br>165897 | HEAT EXCHANGER<br>HEAT GENERATOR<br>← 152<br>← 154 | 41C11<br>42K1E | 814203-4<br>FH30001G2 | 97%<br>91% |
| 146 2 | 165900<br>165900<br>165900 | ← 156<br>← 158<br>← 160 | | | |
| 3 | | | | | |
| 4 | | | | | |

| | |
|---|---|
| 164 TOTAL ELECTRIC GENERATORS WITH PROBABILITY OF FAILURE > 90%. | 3 |
| 166 TOTAL HEAT EXCHANGERS WITH PROBABILITY OF FAILURE > 90%. | 8 |

SYSTEM, METHOD AND PROGRAM PRODUCT FOR PREDICTING FLEET RELIABILITY AND MAINTAINING A FLEET OF VEHICLES

CROSS REFERENCE TO RELATED APPLICATION

The present application is related to U.S. patent application Ser. No. 11/489,864 filed Jun. 20, 2006, entitled "MAINTENANCE INTERVAL DETERMINATION AND OPTIMIZATION TOOL AND METHOD," to Ken D. Bouvier et al., assigned to the assignee of the present application and incorporated herein by reference.

BACKGROUND OF THE INVENTION

1. Field of the Invention

The present invention generally relates to fleet vehicle reliability and mission assurance and, more particularly, the present invention relates to improving overall platform reliability and logistic reliability for a fleet of vehicles or platforms, such as aircraft.

2. Background Description

Reliability of a large fleet of vehicles or platforms, such as a fleet of aircraft, is the cumulative reliability of all aircraft in the fleet. So, it may be critical to know the relative health of particular platform relative to the fleet as a whole. For example, it is important for mission success that aircraft selected for a vital mission do not suffer a component failure during the mission. A component failure that causes one or more aircraft to abort the mission may result in mission failure. If one knows individual aircraft reliability prior to selection, one can avoid selecting compromised aircraft or, at least perform preventative maintenance on those compromised aircraft prior to embarking on the mission.

So, improving fleet reliability requires improving the reliability of individual aircraft. Improving the reliability of each individual aircraft requires improving reliability of every component in each aircraft. Currently, fleet health is predicted manually using a broad-brush "best guess" approach. Maintenance personnel estimate the health of individual aircraft and overall fleet health based on intuition guided by top-level maintenance history records. Typically, no matter how experienced the maintenance personnel, personal experience of even several people cannot encompass all available data, i.e., no one knows everything. Consequently, these best guess predictions, based on maintenance personnel experience and intuition, are both imprecise and inaccurate.

One way to improve the reliability of such predictions is by pin pointing those aircraft that are the highest risk of some type of problem. Once problem aircraft are identified, those aircraft may be excluded from upcoming tours or repaired before deploying. However, addressing such problems, may require identifying aircraft components that are likely to fail. Once identified, those failing components may be replaced, providing spares are on hand for replacements. With the prior best guess approach, using available data and a number of gross assumptions to estimate the reliability, it was hit or miss, not only whether a potential problem might be anticipated, but even whether sufficient spares were available in inventory when a part failed.

Inventory stock may be ordered, for example, based on consumption history for the fleet. However, parts that were installed during that previous period are relatively new and each component that had been installed prior to the last quarter is one quarter older. In most cases, the newer parts are less likely to fail and older parts more. In another example, the available failure data for military applications is seldom based on similar (to current) operating conditions. Military aircraft may be deployed to a humid jungle one month and to a desert the next.

Consequently, gross assumptions based on history vary too widely to provide reasonably accurate or consistent estimates. As a result, various programs may suffer from wildly divergent product reliability estimates with subsequent cost and schedule estimating errors. Inventory may be oversupplied with a previously failing part and undersupplied for a part, e.g., a part that has a relatively large population approaching end of life. Failure to have sufficient quantities of the correct replacement parts on hand, at the very least, impairs fleet readiness and may cause the failure of an entire mission.

Accordingly, there is a need for accurate fleet wide aircraft failure prediction to identify aircraft that are unlikely to complete an assigned mission and, more particularly, for an accurate fleet wide aircraft component failure prediction for inventory control and optimization to improve the likelihood of identifying and repairing those fleet aircraft that are otherwise unlikely to complete an assigned mission.

SUMMARY OF THE INVENTION

An embodiment of the present invention includes a system, method and program product for maintaining fleet performance for a fleet of platforms, especially for a fleet of aircraft. Part removal data is contained in a maintenance database. A query is constructed for extracting part removal data from the maintenance database. Weibull analysis is applied to extracted part removal data. Exposed platform with parts being likely to fail within a given time period are identified from the Weibull analysis results. Overall part failure numbers are generated for each failing part. Inventory is checked to determine if sufficient spares are available to repair all expected failures. Any shortfalls may be covered. A risk report is generated for the fleet and for inventory. Each risk report highlights likely problems that may require immediate attention.

Advantageously, one embodiment of the present invention provides survival predictions for a platform and specific parts in each platform in a detailed systematic approach to more accurately predict part-level repair-shop throughput. The survival predictions may be used for calculating fleet wide failure probability for each part. Such fleet wide analysis provides an accurate assessment of fleet health, supply chain risks, and potential demand spikes. Further, instead of best guess estimates of fleet health, part survival is quantified in easy to understand graphs that may be interactively generated and provide estimates based on actual part lifetime reliability statistics. Thus, the present invention enables dynamic resource utilization and allocation, so that inventory is maintained and optimized based on actual fleet performance of each part. Because the parts are identified with specific platform, distribution of parts failures over their life-cycle and geographic location is predictable. Thus, the supply chain may be optimized, ordering spares in sufficient quantity and locating those spares where they are likely to be needed. Further, allocating resources according to predictions based on actual fleet performance, minimizes part cost and the risk of platform failures, to improve the likelihood of success for each mission.

BRIEF DESCRIPTION OF THE DRAWINGS

The foregoing and other objects, aspects and advantages will be better understood from the following detailed description of a preferred embodiment of the invention with reference to the drawings, in which:

FIG. 3 shows an example of a partial risk table, e.g., in a risk report, generated from the fleet health indicator realized by plotting fleet aircraft on LRU Weibull curves.

DETAILED DESCRIPTION OF THE INVENTION

Figure 1A:
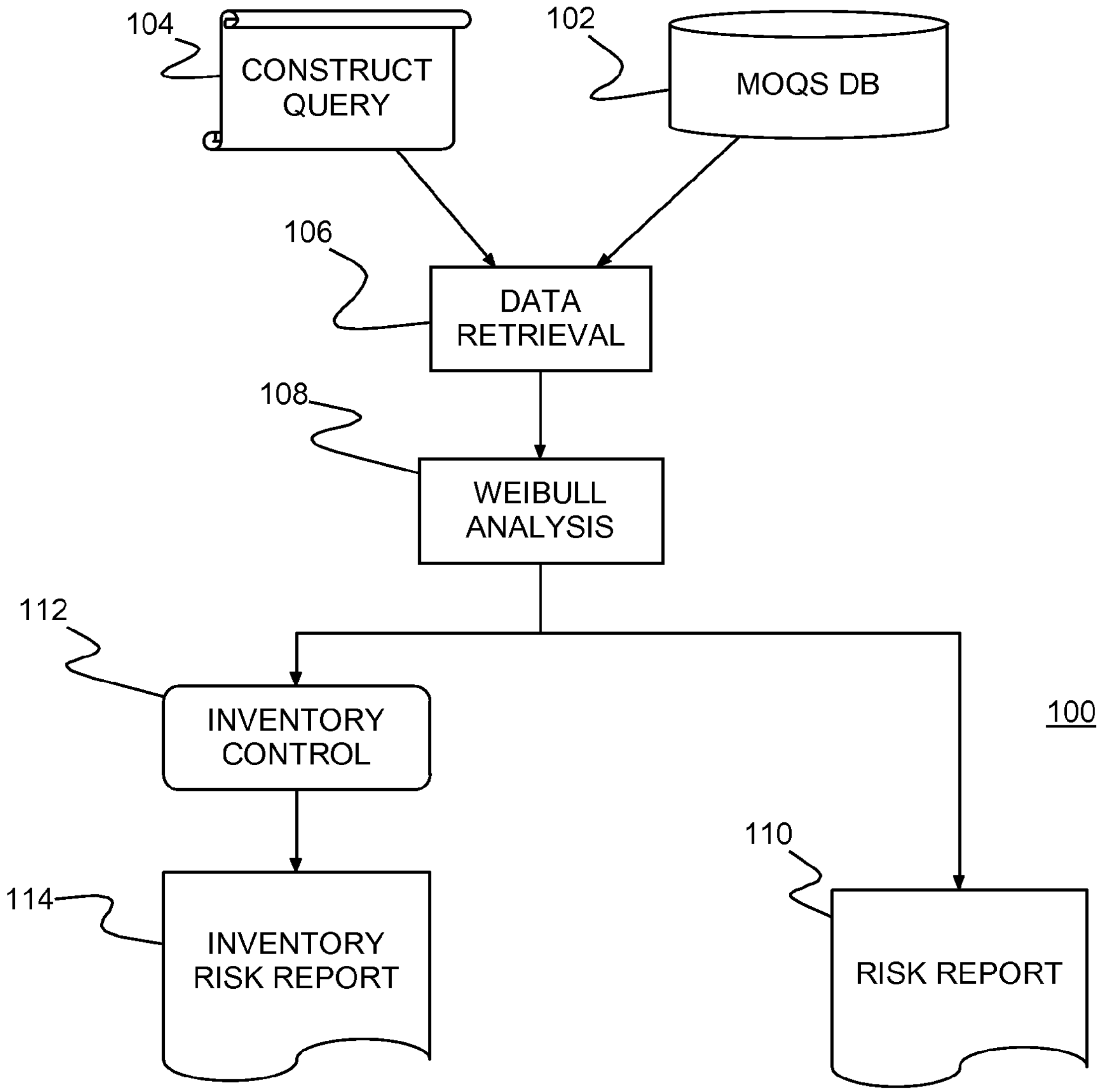
FIGS. 1A-B show an example of a Fleet Performance Optimization Tool (FPOT) 100 according to an advantageous embodiment of the present invention.
Figure 1B:
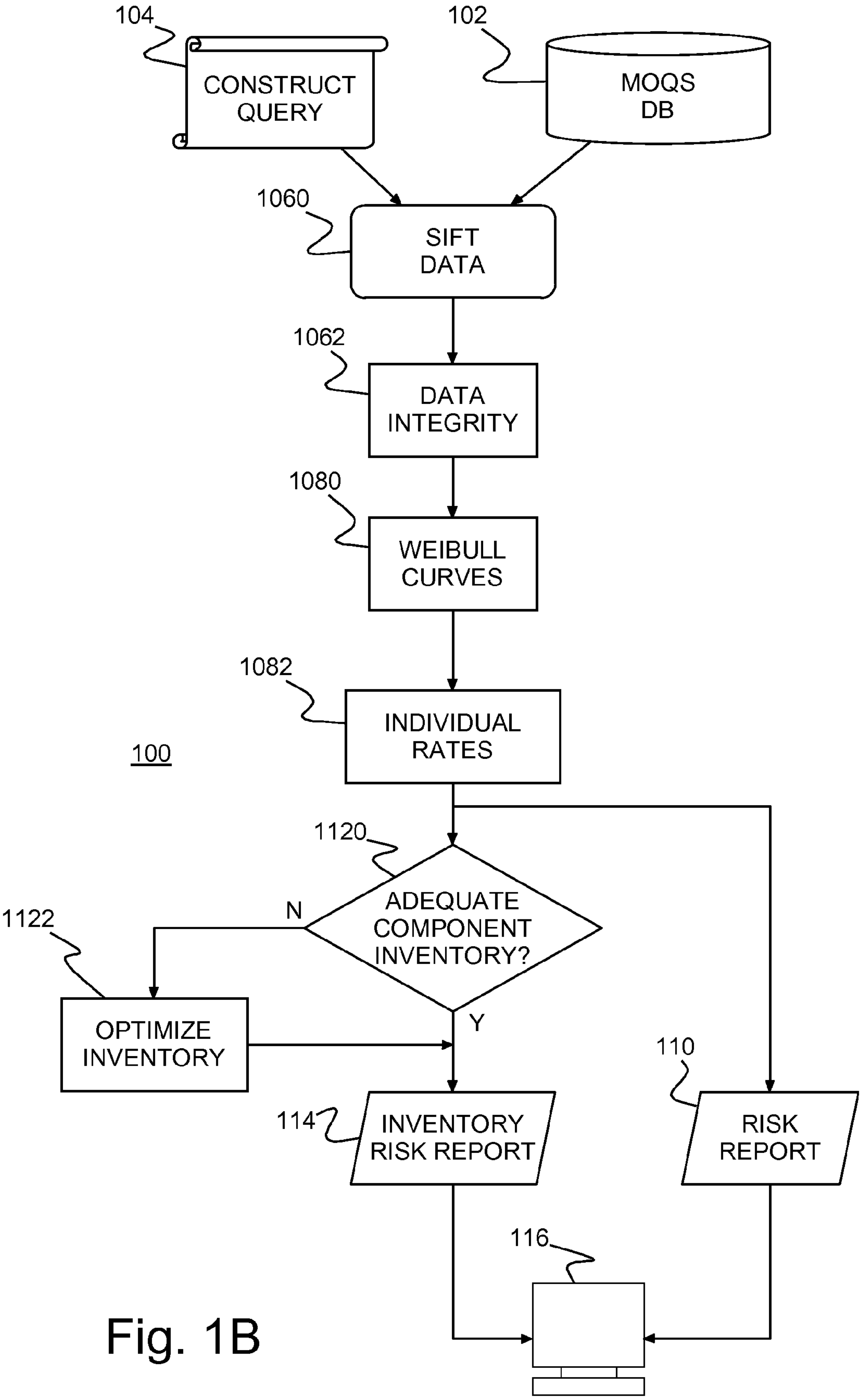

Turning now to the drawings and more particularly, FIGS. 1A-B show an example of a Fleet Performance Optimization Tool (FPOT) 100 according to an advantageous embodiment of the present invention. FIG. 1A shows an overview example and FIG. 1B shows a corresponding example in more detail with like elements labeled identically. A preferred FPOT 100 has application to analyzing and determining reliability from maintenance history data that has been collected and stored, e.g., in a database 102, for any sized fleet (even as small as a single mobile platform) of any type of system, vehicle or mobile platform, whether air, surface or subsurface vehicles. The analysis results indicate individual vehicles that may be mission critical (e.g., on the verge of part failure) or that may be borderline operational, e.g., on the verge of becoming mission critical. In particular, a preferred FPOT 100 has application to analyzing and determining overall reliability for any sized fleet of such vehicles, preferably of aircraft.

It should be noted that, although described herein with reference to aircraft, this is for example only and not intended as a limitation. The terms vehicle and platform or mobile platform are used interchangeably herein to refer, for example and without limitation, to manned or unmanned vehicles, trucks, automobiles, trains, maritime vessels, and missiles or other weapons. Further, a preferred FPOT 100 may have application to optimizing performance and improving overall reliability of any pseudo-fleet of vehicles (e.g., the same make and model of amphibious craft currently in service), provided maintenance history data is been collected in a suitable database 102 and maintained for fleet vehicles over the life of each vehicle. Moreover, as used herein, a unit may include components and/or subunits; a subunit may include components and components may include subcomponents. Typically, a mobile platform such as an aircraft includes units, components and/or subunits, and subcomponents. Further, unless specifically indicated otherwise, as used hereinbelow, reference to parts is intended to include units, components, subunits, and sub-components without limitation.

Optimization begins in step 104 by a constructing a query to extract maintenance event data for the whole fleet and especially part removal data for vehicle units, subunits and components. In step 106 part removal data is collected periodically (e.g., weekly or monthly) applying the query to the database 102 using automated batch data retrieval to sift 1060 the database 102 according to the particular query 104. The extracted part removal data may be cleaned in step 1062. Then, the cleaned data passes to Weibull analysis 108. Weibull analysis 108 generates Weibull curves 1080 for the vehicle and for individual parts and replacement parts. So essentially, the Weibull analysis produces a survival function for each part selected in the search query from step 104. The fleet is mapped 1082 onto the Weibull curves to provide individual fleet optimization rate for each vehicle and for individual parts in each vehicle as well.

A risk report 110 is generated from the Weibull curves. Depending upon the desired level of detail, the risk report 110 reflects the health of each individual vehicle and of parts in each individual vehicle as well. Substantially in parallel, the Weibull analysis results are analyzed for inventory control 112 to quantify expected part failures over a given time window, as well as the location of the aircraft expected to experience those failures. So, in step 1120 the part inventory is checked both for need and location based on the mapping results from step 108. If the current inventory of replacement parts falls short of what may be needed in the selected time window or in a selected location, then in step 1122 inventory levels are adjusted for optimum, e.g., spares are ordered or relocated. Optionally, if some parts are found to be overstocked, those overstocked units may be returned, e.g., to a respective supplier. If in step 1120 sufficient inventory is on hand at each location, or after ordering or relocating inventory in step 1122, an inventory risk report 114 is generated. The inventory risk report 114 reflects any potential inventory shortfalls and exposures, as well as parts ordered in step 1122, tracking information and expected delivery dates. Finally, one or both of the risk report 110 and the inventory risk report 114 may be displayed 116, e.g., in a graphical user interface (GUI) window on a computer monitor for interactive analysis.

So for example, the database 102 may contain aircraft maintenance data with removal records for aircraft parts, the age at removal and the age of currently installed parts. Preferably, the database 102 is in a Maintenance and Operational Query System (MOQS) suitable format. The queries 104 may be MOQS queries constructed to periodically extract aircraft maintenance data in an automated batch data retrieval. Preferably, the query 104 is constructed to provide the search criteria for identifying all removal events including aircraft identification, part identification and corresponding fleet hour, e.g., part removal time data at each removal. For example, aircraft identification may be the aircraft serial number or bureau number (BuNo or BUNO) or simply airplane model number. The part identification may be a Work Unit Code (WUC) or an Airline Stock Number (ASN), part number, and part serial number when available. Also, the extracted part removal data fields may include, for example, complaint text, maintenance action text. Each query based search 106 sifts 1060 through the database 102 and provides data for each removal event with necessary information to identify relevant removal events and to perform a Weibull analysis 108 on the search results.

Integrity of the data included in the Weibull analysis (108 in FIG. 1A) depends on the source, i.e., the collected data maintained in the database 102. So, in step 1062, the collected data is checked to determine if it satisfactory. If, for example, the collected data is inadequate, insufficient or spotty, it may be necessary to clean the extracted results. Optionally, if the data requires cleaning, the validity of each entry may be verified, e.g., manually by an analyst. Query results may be exported to a separate working database and subjected to data cleaning substantially similar to data cleaning in Oracle® Text. Moreover, each query 104 may be customized for text mining for a specific part and failure mode for each particular part or system under review. Also, in some cases, it may be necessary to check the extracted part removal data after cleaning for the presence of any non-events that may have been included in the results. Any non-events that are found may be removed.

Data points remaining after sifting and cleaning the data in 106 may be formatted into a part removal event table. Then, for example, the part removal event table may be merged with a flight hour table, (e.g., by operator, manufacturer serial number, year and month) to determine part lifetimes. Part lifetimes may include the times to first removal on each aircraft, and the flight hours between consecutive removals on the same aircraft. Also, the part lifetimes may include the cumulative number of hours for a part without failure on each aircraft, i.e., the right-censored times. Since the expected lifetime for a particular part is no longer than that of critical such subparts, part lifetimes can be determined from subpart lifetimes.

Figure 2A:
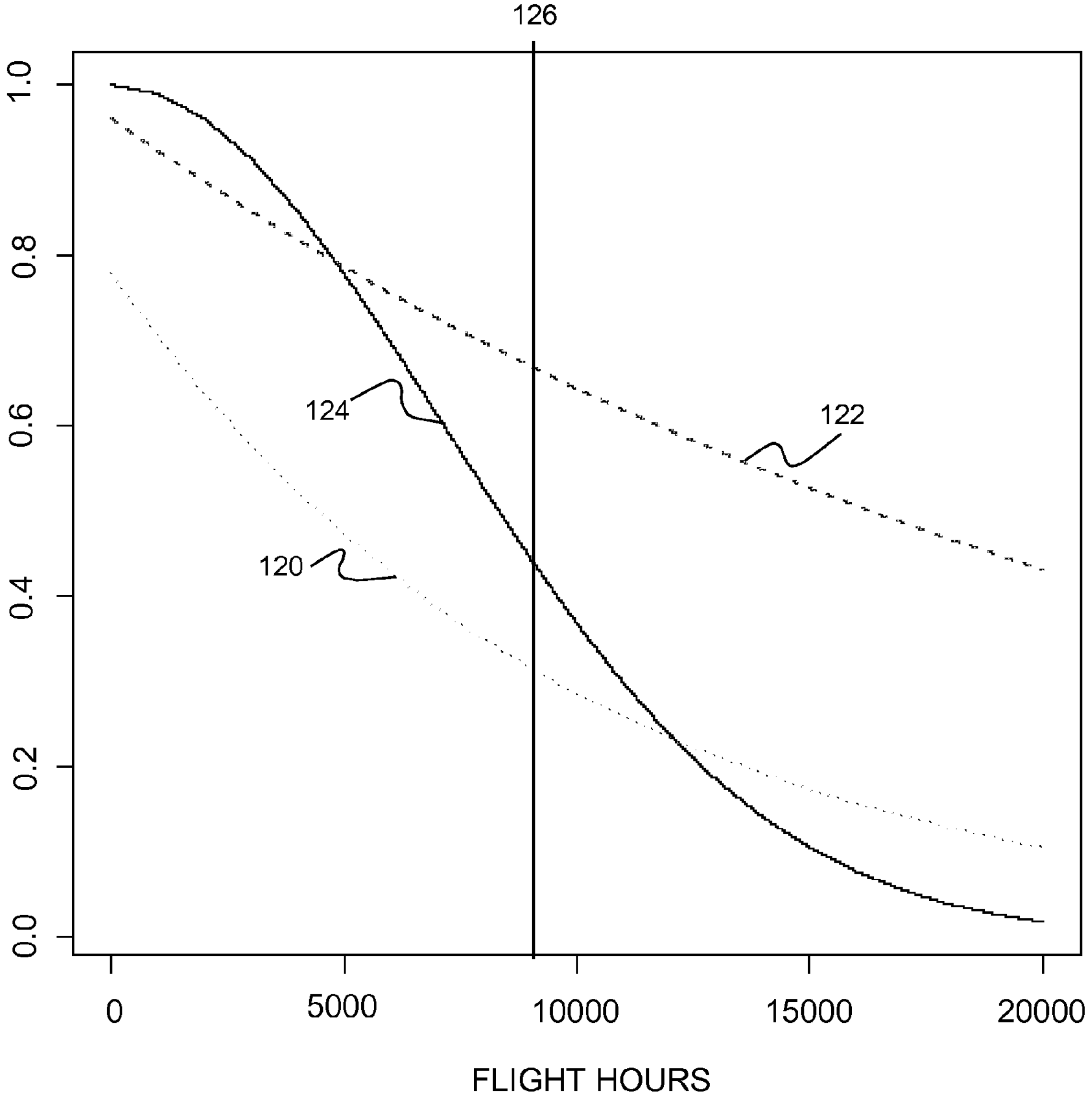
FIGS. 2A-C show an example of part curves generated in Weibull analysis.
Figure 2B:
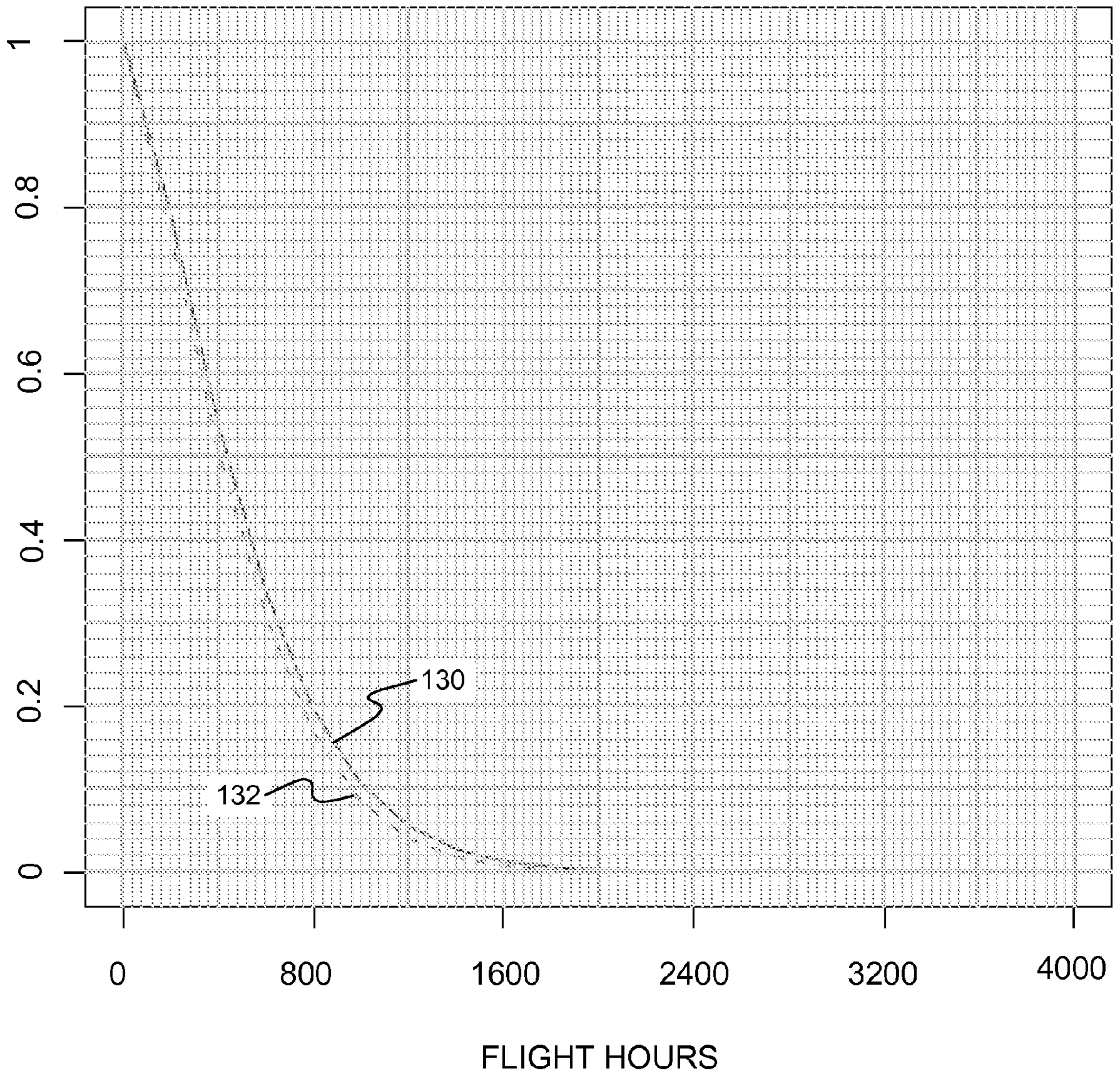
Figure 2C:
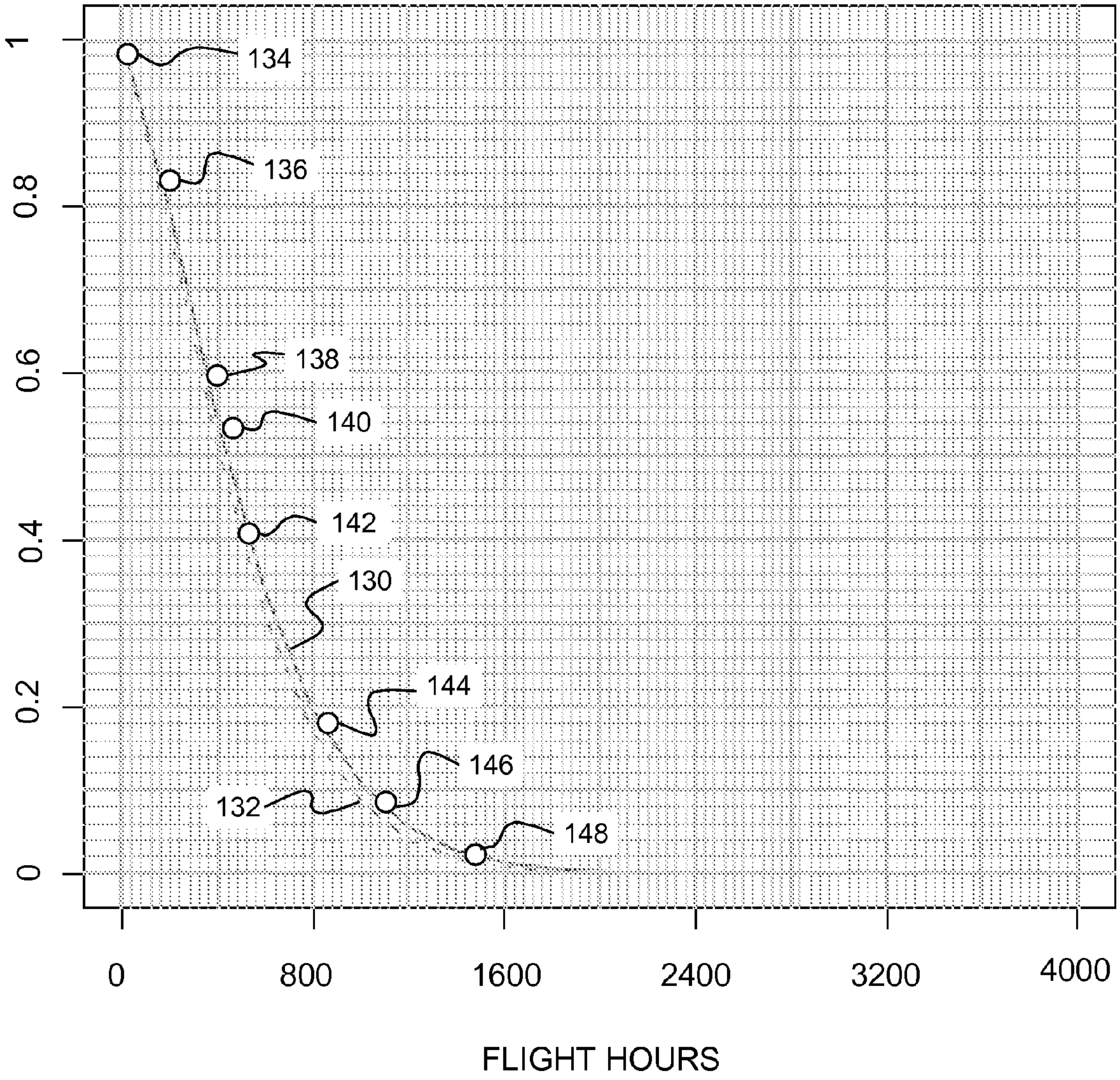

FIGS. 2A-C show an example of part curves generated in Weibull analysis 108. FIG. 2A shows an example of conditional part survival probability curves 120, 122 for the fleet plotted from the Weibull analysis conditional probability function for a survivability curve 124 for new parts. The Weibull analysis conditional probability function computes the probability that a specific part will last another X number of hours based on its current state. So, in this example, the likelihood of new part with survivability curve 124 surviving at least 9000 flight hours 126 is 44%.

FIG. 2B shows an example of conditional probability or Weibull curves 130, 132 from Weibull analysis 108 based on one year in service data for a particular line-replaceable unit (LRU), a heat exchanger in this example. Curve 130 indicates the Weibull distribution for the heat exchanger. Curve 132 indicate the lower limit of a 95% confidence system level of the LRU surviving for the next one hundred (100) flight hours beyond its current usage (in flight hours). As shown in the example of FIG. 2C, fleet health can be measured by plotting individual aircraft along the Weibull curve 130, 132 survival function at points 134, 136, 138, 140, 142, 144, 146, 148. These points 134, 136, 138, 140, 142, 144, 146, 148 indicate the likelihood of the LRU (the heat exchanger) failing in each corresponding aircraft in the next 100 flight hours. From this example, it is apparent that three fleet aircraft, represented at points 144, 146, 148, have a high risk of LRU failure within the next 100 flight hours. Thus, mapping the fleet aircraft indicates part demand by how many fleet aircraft are likely to suffer LRU failures (3 in this example) in the time interval and which are those aircraft. Further, the supply chain may be optimized for that expected part demand, i.e., having on hand a sufficient quantity of spares to meet local demand without over-stocking to compensate for uncertainties of best guess estimates.

So, once conditional lifetimes are determined and plotted on a Weibull curve (e.g., 130, 132 in FIGS. 2B-C) or each part, the Weibull curve 130, 132 provides aircraft survival intervals that have been derived from analysis of historic failures and current part times. Thus, the Weibull curves 130, 132 are survival curves that graphically present detailed information on a particular level of conditional life expectancy, conditioned on the current part age, of a particular part on a particular aircraft.

FIG. 3 shows an example of a partial risk table 150, e.g., in a risk report 110 in FIGS. 1A-B. The risk table 150 may be generated from the fleet health indicator realized by plotting fleet aircraft on LRU Weibull curves, e.g., from FIG. 2C. In this example, BUNO 165897 at 148 has parts with the lowest fleet wide survival rate and so, is most likely to experience a heat exchanger failure within the next 100 flight hours with a 97% probability of failure. Also, the electric generator is likely to fail for this same aircraft within the next 100 flight hours with a 91% probability of failure. In this example both the WUC and part number are included for each potentially failing part. Other parts 152, 154 are also listed with the potentially failing parts. Similarly, BUNO 165900 at 146 with the next lowest part survival rate and has entries 156, 158, 160 for each part. Further, entries 146, 148 may be color coded to emphasize the probability of failure.

Although the present invention may not in itself provide inventory planning, the preferred FPOT 100 can be used to support inventory management and especially for optimizing inventory logistics. Maintenance and operations can optimize scheduling based on the risk report 110, which may recommend maintenance actions, e.g., replace all components with a predicted survivability above a threshold level (or a high probability of failure within a given period of operation). For example, by determining the status of squadron health prior to deployment or the status of aircraft prior to selection for a long airtime mission, compromised aircraft can be identified. By identifying compromised aircraft reliability exposures can be addressed before deployment or embarking on the mission. Thus the top level risk report 150 includes additional probability of failure detail specific to each aircraft and more particularly by part.

Once the survival curve has been identified for a part, the aircraft 134, 136, 138, 140, 142, 144, 146, 148 are mapped onto the curve. From plotting the aircraft 134, 136, 138, 140, 142, 144, 146, 148, part demand (112 in FIG. 1A) across the fleet may be predicted. Since the location of each aircraft is known, the demand may be characterized by geographic location. By predicting part demand, a inventory risk analysis 114 may be conducted to evaluate the costs and benefits associated with ordering spares or moving excess spares from one location to another where a shortfall exists. Further, as a byproduct of the Weibull analysis, the aircraft may be ranked based on total risk of failure, e.g., 110.

So, the example of FIG. 3 also includes a fleet-wide part exposure list 162 listing the number of each LRU that has a high probability of failure within the same time period, i.e., 100 fight hours in this example. The first entry 164 of this example indicates that fleet-wide, 3 electric generators have a likelihood of failure of greater than 90%. Similarly, the second entry 166 indicates that fleet-wide, 8 heat exchangers have a likelihood of failure of greater than 90%. These levels are compared with current spares inventory levels for those LRUs (e.g., in steps 112, 1120) and used to optimize supply chain activities (step 1122) as necessary. Also, by cross referencing to the location of each potentially compromised aircraft, the supply chain may be optimized based on the distribution of the parts over their life-cycle and the geographic location of predicted failures. This fleet-wide part exposure list 162 may be included in the inventory risk analysis 114.

Advantageously, the present invention provides survival predictions for aircraft and specific parts in each aircraft in a detailed systematic approach to more accurately predict part-level repair-shop throughput. The survival predictions may be used for calculating fleet wide failure probability for each part. Such fleet wide analysis provides an accurate assessment of fleet health, supply chain risks, and potential demand spikes. Further, instead of best guess estimates of fleet health, part survival is quantified in easy to understand graphs that may be interactively generated and provide estimates based on actual part lifetime reliability statistics. Thus, the present invention enables dynamic resource utilization and allocation, so that inventory is maintained and optimized based on actual fleet performance of each part. Because the parts are identified with specific aircraft, distribution of parts failures over their life-cycle and geographic location is predictable. Thus, the supply chain may be optimized, ordering spares in sufficient quantity and locating those spares where they are likely to be needed. Further, allocating resources according to predictions based on actual fleet performance, minimizes part cost and the risk of aircraft failures, to improve the likelihood of success for each mission.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

We claim:

1. A method of maintaining fleet performance for a fleet of platforms, said method comprising the steps of:

a) querying a platform maintenance database for part removal data of parts in each platform;

b) performing Weibull analysis on said part removal data;

c) generating a risk report indicating platforms having a probability of failure above a selected threshold in a selected time window; and d) generating an inventory risk report indicating current inventory exposures.

2. A method as in claim 1, wherein said fleet of platforms is a fleet of aircraft.

3. A method as in claim 2, wherein the step (a) of querying said aircraft maintenance database comprises the steps of:

i) periodically applying a query to said aircraft maintenance database, said query being constructed to search for all removal events of a particular aircraft part; and ii) extracting selected data for each identified removal event.

4. A method as in claim 3, wherein extracted said selected data includes aircraft serial number, component removal date, complaint text, maintenance action text, part number, and serial number.

5. A method as in claim 2, wherein the step (b) of performing Weibull analysis comprises the steps of:

i) generating survival curves for each of said parts;

ii) mapping said fleet of aircraft onto each survival curve; and iii) recording a probability of failure for each part for each said aircraft.

6. A method as in claim 2, wherein each said risk report indicates all parts having a high probability of failure in each said aircraft and the step (c) of generating said risk report comprises the steps of:

i) assigning a priority to each said aircraft; and ii) displaying said risk report.

7. A method as in claim 6, wherein each displayed said risk report is color coded by overall risk level for said each aircraft.

8. A method as in claim 2, wherein the step (c) of generating said inventory risk report comprises the steps of:

i) checking status of current inventory, said inventory risk report indicating results of checking said status; and ii) displaying said inventory risk report.

9. A method as in claim 8, wherein the step (i) of checking status comprises the steps of:

i) determining whether current inventory contains sufficient spare parts to replace any expected failing parts identified for indicated aircraft in step (c);

ii) ordering additional spares for any part identified as having insufficient spare parts in current inventory; and iii) documenting current inventory for all said expected failing parts.

10. A method as in claim 1, wherein the inventory risk report comprises:

documented said current inventory; and suggested current inventory levels for all said expected failing parts.

11. A method as in claim 10, wherein each displayed said inventory risk report is color coded by overall risk level for said expected failing parts.

12. A computer program product for fleet performance optimization, said computer program product comprising a computer usable medium having computer readable program code stored thereon, that when loaded in a computer controls the computer in performing fleet performance optimization, said computer-readable program code comprising:

computer readable program code means for maintaining a platform maintenance database;

computer readable program code means for periodically extracting part removal data from said platform maintenance database;

computer readable program code means for performing Weibull analysis on extracted said part removal data; and computer readable program code means for generating risk reports indicating platforms having a probability of failure above a selected threshold in a selected time window and current inventory spare shortfalls.

13. A computer program product for fleet performance optimization as in claim 12, wherein said fleet of platforms is a fleet of aircraft and said extracted part removal data includes aircraft serial number, component removal date, complaint text, maintenance action text, part number, and serial number.

14. A computer program product for fleet performance optimization as in claim 13, wherein computer readable program code means for performing Weibull analysis comprises:

computer readable program code means for generating survival curves for each of said parts;

computer readable program code means for mapping said fleet of aircraft onto each survival curve; and computer readable program code means for recording a probability of failure for each part for each said aircraft.

15. A computer program product for fleet performance optimization as in claim 12, wherein computer readable program code means for generating risk reports comprises:

computer readable program code means for assigning a priority to each risk report entry; and computer readable program code means for color coding entries for display by overall risk level.

16. A computer program product for fleet performance optimization as in claim 15, wherein computer readable program code means for generating risk reports comprises:

computer readable program code means for determining whether current inventory contains sufficient spare parts to replace any expected failing parts;

computer readable program code means for ordering additional spares for any identified shortfall; and computer readable program code means for documenting current inventory for all said expected failing parts.

17. A system for maintaining a fleet of platforms, said system comprising:

a platform maintenance database;

means for entering a database query, said database query constructed to extract part removal data from said platform maintenance database;

means for periodically applying said database query to said platform maintenance database;

means for cleaning search results from application of said database query to said platform maintenance database;

means for performing Weibull analysis on extracted cleaned said search results;

means for generating risk reports indicating platforms having a probability of failure above a selected threshold in a selected time window and current inventory spare shortfalls; and means for displaying said risk reports.

18. A system as in claim 17, wherein said fleet of platforms is a fleet of aircraft and said search results is part removal data and includes aircraft serial number, component removal date, complaint text, maintenance action text, part number, and serial number.

19. A system as in claim 18, wherein said means for performing Weibull analysis comprises:

means for generating survival curves for each of said parts;

means for mapping said fleet of aircraft onto each survival curve; and means for recording a probability of failure for each part for each said aircraft.

20. A system as in claim 17, wherein said means for generating risk reports comprises:

means for assigning a priority to each risk report entry; and means for color coding entries for display by overall risk level.

21. A system as in claim 20, wherein said means for generating risk reports comprises:

means for determining whether current inventory contains sufficient spare parts to replace any expected failing parts;

means for ordering additional spares for any identified shortfall; and means for documenting current inventory for all said expected failing parts.

* * * * *